J. C. QUINN.
STEAM PLANT SYSTEM.
APPLICATION FILED AUG. 4, 1908.
987,168.
Patented Mar. 21, 1911.
3 SHEETS—SHEET 1.
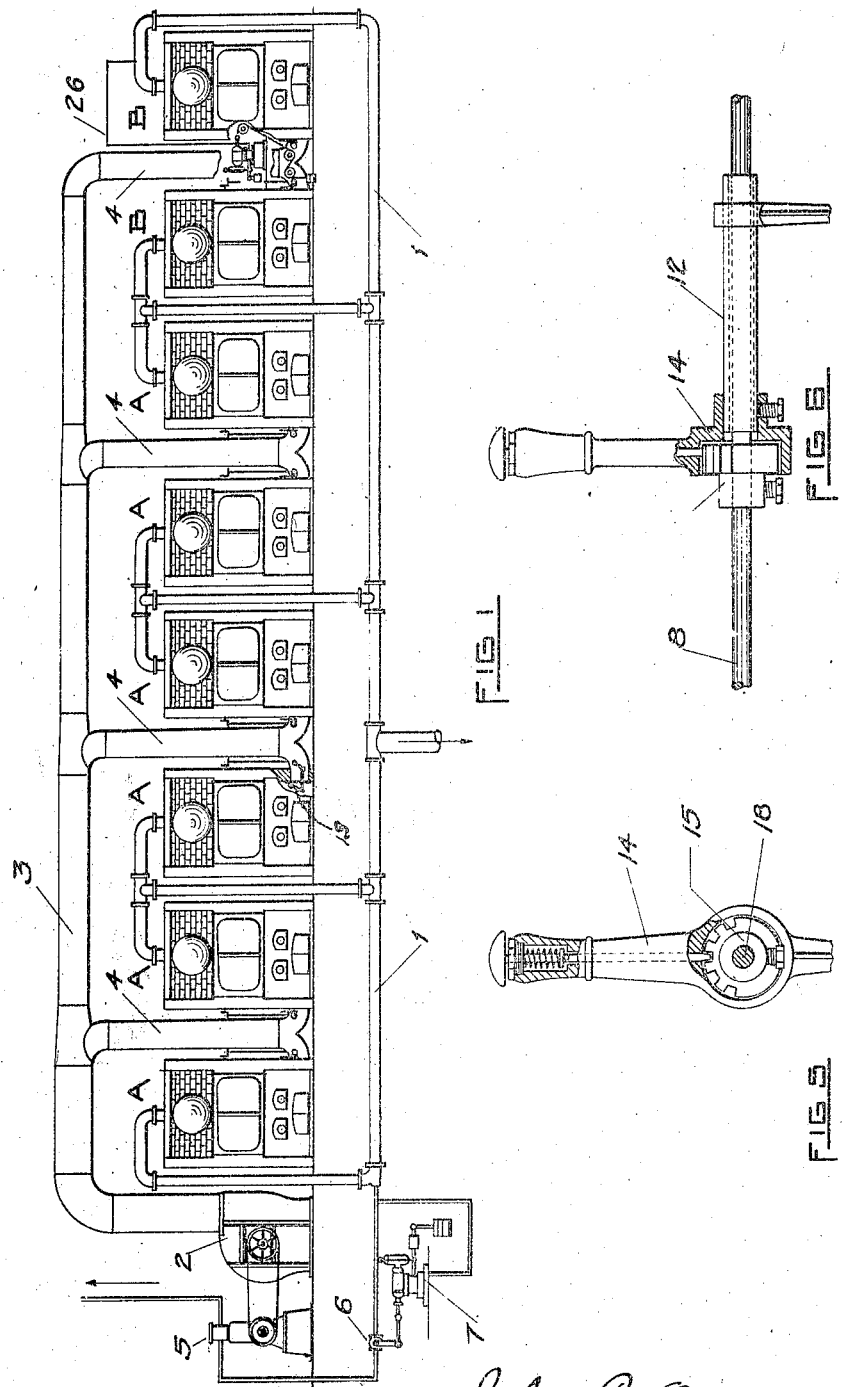

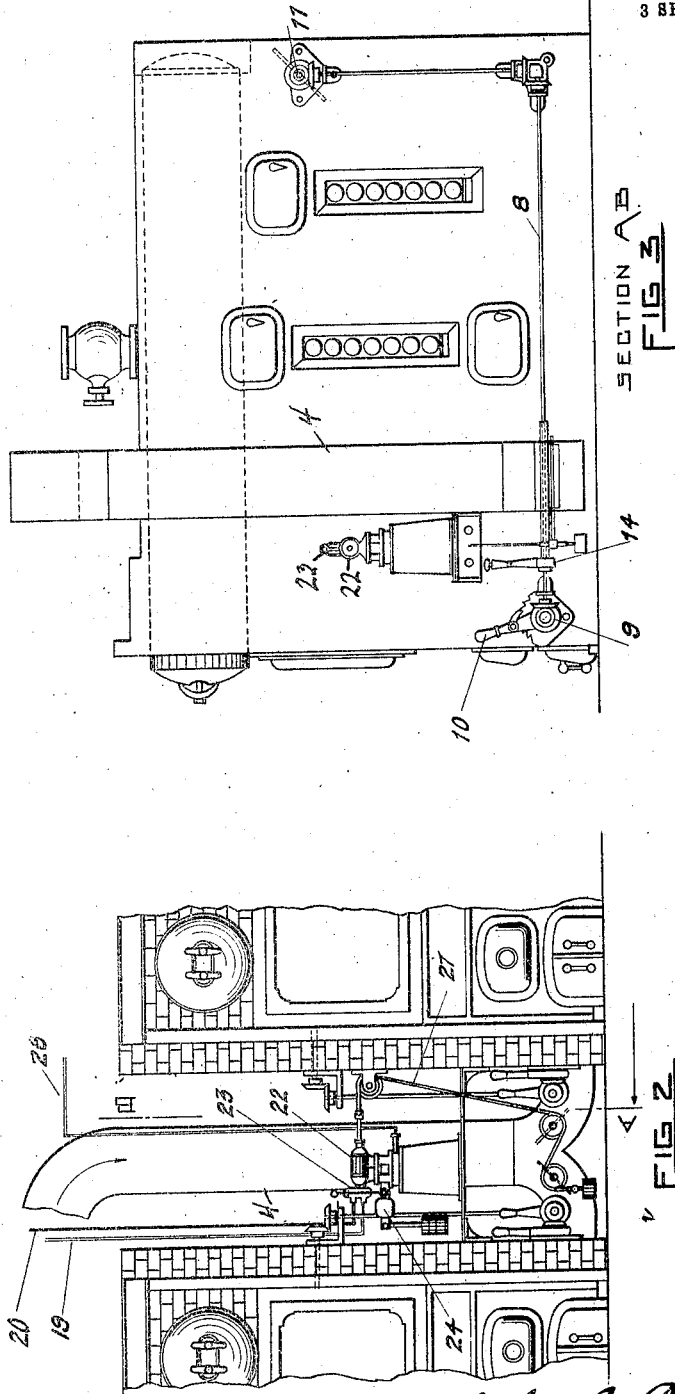

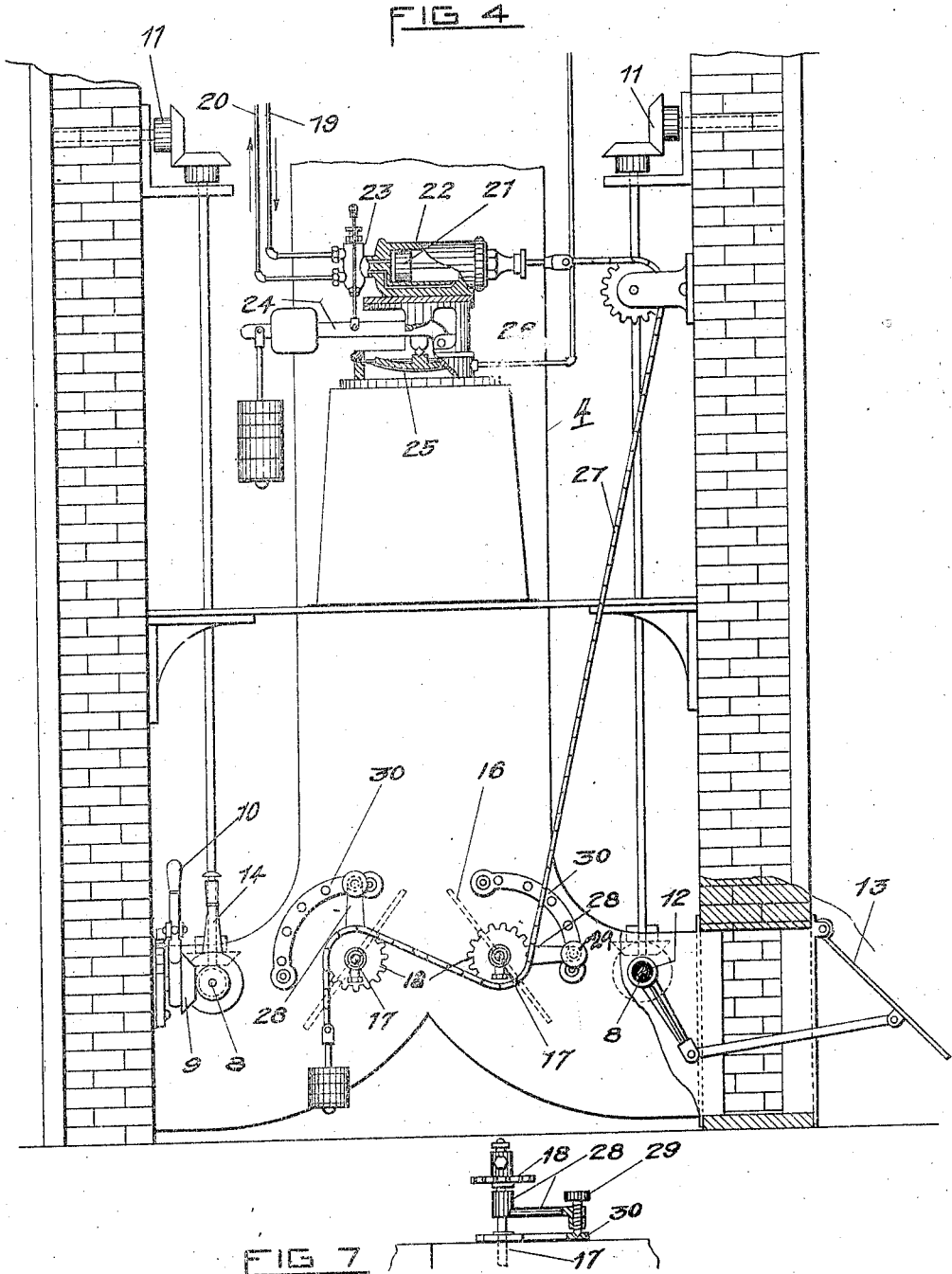

UNITED STATES PATENT OFFICE.

JOHN C. QUINN, OF NEW YORK, N. Y.

STEAM-PLANT SYSTEM.

987,168.    Specification of Letters Patent.    Patented Mar. 21, 1911.

Application filed August 4, 1908. Serial No. 446,868.

*To all whom it may concern:*

Be it known that I, JOHN C. QUINN, a citizen of the United States, and a resident of the borough of Manhattan, in the city, county, and State of New York, have invented certain new and useful Improvements in Steam-Plant Systems, of which the following is a full, true, and complete specification.

The method herein described seeks to accomplish an economy in the operation of steam-plants by supplying a portion of the entire load demand on the plant, from a number of the furnace boilers thereof, each of which is operated under such fixed conditions of combustion as may be best suited to its particular requirements, and supplying the remaining and fluctuating portion of the load demand from a further number of furnace boilers which are variably operated for this purpose. In this manner it is intended that preferably a major portion of the total vaporization requirement of the plant shall be supplied from an appropriate number of boiler furnaces, operated under conditions approaching as closely as possible to maximum efficiency, and thus with the least consumption of fuel, while the losses inevitably attendant upon regulation of combustion to meet fluctuations of load, are confined to the comparatively smaller number of variably operated furnaces and are hence correspondingly reduced. The method in its preferred detail contemplates the regulation of those boilers which serve as the constant supply furnaces, by introducing into the same a constant delivery of forced air and adjusting the stack dampers thereof so that a fire-chamber pressure approximating atmospheric pressure is normally maintained therein. The appropriate regulation of the variable supply furnaces is accomplished by varying the amount of forced draft admitted to their ash-pits, the stack dampers of such variable furnaces remaining in a fixed position of adjustment which is preferably suited to the normal or average requirement upon them. The duty of generating the normal or average output of steam will be thus divided between the constant and variable furnaces, the variable furnaces being operated to satisfy such fluctuations as ordinarily take place, but in the event of a change in load exceeding the limits of range served by the variable furnaces, the invention contemplates a general regulation of the constant supply furnaces or of all the furnaces in order to meet the emergency. This general regulation may be and preferably is effected, in forced draft systems, by varying the force of the draft as by retarding or accelerating the speed of the blower engine, until the desired condition of balance is again restored.

The details of the method, as automatically carried out, will be more apparent from a consideration of the apparatus shown in the accompanying drawings, which also include certain mechanical features constituting part of the invention.

Referring to said drawings, Figure 1 is a diagram illustrating the relative arrangement and mode of operation of the several furnaces of such a plant; Fig. 2 is an enlarged elevation of the governor apparatus as applied to the variable supply furnaces; Fig. 3 is a side elevation of one of such furnaces; Fig. 4 is an enlarged detail of Fig. 2, with parts in section, illustrating the operation of the governor apparatus; Figs. 5 and 6 are enlarged details of the adjustable connection between the ash-pit and up-take dampers, as shown in Fig. 4; and Fig. 7 is a detail.

Referring to Fig. 1, the steam plant taken by way of illustration, comprises a battery of eight furnace boilers, appropriately connected to a common steam header 1, and supplied with forced air-draft appurtenances, which include a blower 2 of usual construction, a main air-flue 3 and several branch pipes 4 leading therefrom to the respective ash-pits of the several furnaces, as plainly indicated. The blower engine 5, shown for convenience as belted to the blower, receives steam from the main header through a steam-pipe and a throttle 6 therein. The said throttle is controlled by a governor 7, which operates, under the control of the steam pressure of the plant, to vary the admission of steam to the blower engine and thereby to increase or diminish the forced draft to satisfy an abnormal condition of the load as above mentioned.

The several furnace boilers, which may be of any appropriate design, are supplied with gearing interconnecting their respective stack and ash-pit dampers so that by the operation of a single handle both dampers of each furnace may be simultaneously operated, and the said interconnecting gearing is supplied with an adjustable connection between the dampers whereby the relative positions of the two may be shifted, as desired, and their simultaneous operation then be effected accordingly. Referring to Fig. 3, the gearing referred to comprises a horizontal shaft 8, provided at its forward end with a bevel gear meshing with a corresponding gear 9 on the hub of a handle lever 10, which latter swings upon a locking segment to which it may be locked by a suitable pawl. The other end of the shaft is connected by simple gearing with the axle 11 of the stack damper. The shaft 8 bears a crank sleeve 12, shown more clearly in Figs. 5 and 6, the crank of which is linked to the interior air supply or ash-pit damper 13 so as to open and close the same, as shown in Fig. 4, and the said sleeve carries a locking handle 14 that coöperates with a notched disk 15 fast on the shaft 8, so that the sleeve may be fixed to the shaft in different angular positions thereon, corresponding to the desired relative positions of the stack and ash-pit dampers. The construction and operation of the handle 14 will be plain from the drawing.

The boiler furnaces marked A in the diagram of Fig. 1, represent the constant supply furnaces of the plant, and in accordance with this invention the stack and ash-pit dampers of these furnaces are relatively so adjusted, as by means of the handle 14, that the fire-chamber pressure approximates that of the atmosphere, and both dampers are then simultaneously adjusted, by the operating handle 10, so that with a normal or predetermined delivery of forced air, the operation of each furnace will approach as closely as possible its maximum efficiency, which condition may be determined by actual test if necessary or desired. The rate of combustion in such furnaces will be practically constant and variations in such operation, when produced by manipulation of the damper-operating handle 10, will maintain the same fire-chamber pressure. In the preferred practice of the method, the dampers of the constant supply furnaces remain normally set in the above described determinate position, irrespective of what the load may be, the acceleration or retardation of the operation of such furnaces, when necessary, being accomplished by the appropriate regulation of the speed of the blower engine, under the control of the governor 7.

The boilers marked B in Fig. 1 represent the variable supply furnaces, which are adapted to supply the fluctuating balance of the load, over and above that normally constant part thereof which is supplied by the constant supply furnaces. The rate of combustion in these furnaces, in the present instance, is regulated automatically and by means of supplemental air-dampers 16 located in the branches of the air pipes 4 which lead to the ash-pits of the variable supply furnaces. Two such furnaces are shown in the drawings. The supplemental dampers are mounted on axles 17 which extend to the outside of their respective air pipes, where they carry sprocket wheels 18 by means of which they may be simultaneously operated by the motor mechanism of any suitable, steam-controlled governor. Such a governor may be constructed and may operate as shown in Fig. 4, where a supply and exhaust of water through the pipes 19 and 20 is arranged to operate a piston 21 within a hydraulic cylinder 22, following the adjustment of a control valve 23, which latter is operated by a weighted lever 24 that rests on a diaphragm 25 of a steam box, the said diaphragm being exposed to the steam pressure in the main header by a pipe 26 connected with its steam box, as will be plain from the drawing. The piston 21 is connected by a weighted sprocket-chain 27 with the sprocket-wheels 18 of the several variable supply furnaces, so that the air dampers thereof may be operated in unison with each other and under the direct control of the steam pressure in the obvious manner.

The construction and adjustment of the governor are such as will cause it to respond as sensitively as possible to the changes in the steam pressure, so that a decrease thereof, indicating an increase of the load, will at once produce a corresponding opening movement of the air dampers 16 and stimulate the rate of combustion in the variable furnaces sufficiently to raise the pressure to its proper balance. The range of the control of the variable furnaces is desirably fixed so as to include all such normal fluctuations of the load as occur during usual or ordinary conditions. For example, a range of ten pounds, with an adequate number of variable furnaces, is ordinarily sufficient to accommodate usual running fluctuations, but such range may be adjusted according to the judgment of the operator. The governor 7 that controls the general regulation, is set to respond only to changes in steam pressure exceeding the range served by the variable furnaces, and when thus called into operation, serves to admit more or less steam to the blower-engine, and thereby regulate the supply of forced draft to the plant. For this purpose, the governor 7 may be of the same construction as that employed for the variable furnaces, but since it need not be so sensitive, it may use steam instead of water as its motive power for actuating the throttle 6. The construction and connections of the governor will be apparent from the drawings.

The determination of the relative numbers of constant and variable supply furnaces for any given steam plant, will obviously depend upon the ordinary conditions of running, and the constant supply furnaces will preferably be sufficient in number to carry the maximum constant portion of the load, while the variable furnaces will be sufficient to perform the balance within reasonable limits of control. On occasions when the capacity of the plant is desired to be materially or permanently changed, or the range of normal fluctuations is increased or diminished, it may be necessary to alter the relative numbers of constant and variable furnaces, and for this purpose the air-dampers 16 of certain of the variable furnaces are detachably fastened to their sprocket-wheel 18 and adapted to be manipulated or set by a lever 28 fast on the axle of each. The lever 28 carries a set-screw 29 (Fig. 5) in its handle, which coöperates with a series of recesses in an arcuate plate 30, fixed on pipe 4, whereby the adjustment given to the damper may be made permanent.

It will be understood that the several furnaces of the steam plant above described constitute a unit steam supply and that such furnaces are independent only in the sense that each generates the portion of steam which it contributes to the total steam supply.

Having described my invention, what I claim and desire to secure by United States Letters Patent, is:—

1. The method of generating steam for a unit steam supply consisting in generating a portion of the steam for said unit steam supply by operating at a substantially constant rate of combustion, a number of independent steam-generating furnaces to meet a constant part of the load demand upon said unit steam supply and generating the remainder of the steam for the said unit steam supply by simultaneously operating a further number of furnaces at a rate of combustion varying with the variations of the remainder of the load demand upon said unit steam supply.

2. The method of generating steam for a unit steam supply, consisting in generating a portion of the steam for said unit steam supply by operating at a substantially constant rate of combustion a number of independent steam-generating furnaces to meet a constant part of the load demand upon said unit steam supply, and generating the remainder of the steam for said unit steam supply by simultaneously operating a further number of furnaces by supplying air to the ash-pits thereof at a pressure above atmosphere and at a uniform rate of delivery and adjusting the discharge of gases from the combustion chambers of such furnaces relative to their air supply to maintain a predetermined uniform pressure in said chambers, and then simultaneously regulating the air supply and gas discharge, whereby the rate of combustion in said further number of furnaces is varied without affecting the said pressure.

3. The method of generating steam for a unit steam supply, consisting in generating the major portion of the steam for said unit steam supply by operating at a substantially constant rate of combustion a number of forced-draft, steam-generating furnaces to meet a constant part of the load demand upon said unit steam supply, and generating the remainder of the steam for the said unit steam supply by simultaneously operating with forced draft a further number of furnaces at a rate of combustion varying with the variations of the remainder of the load demand upon said unit steam supply.

In testimony whereof, I have signed my name to the specification in the presence of two subscribing witnesses.

JOHN C. QUINN.

Witnesses:
H. G. KIMBALL,
G. A. TAYLOR.